(12) United States Patent
Sanghavi et al.

(10) Patent No.: US 11,991,142 B1
(45) Date of Patent: May 21, 2024

(54) PROVIDING CLOUD-AWARE SECURITY FOR AN APPLICATION LEVEL NETWORK DEVICE

(71) Applicant: Juniper Networks, Inc., Sunnyvale, CA (US)

(72) Inventors: Dilip H. Sanghavi, San Ramon, CA (US); Girish Kumar Attimgere Lingaiah, San Jose, CA (US); Sai Sundar Ramamurthy, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/185,282

(22) Filed: Mar. 16, 2023

(51) Int. Cl.
| | |
|---|---|
| *H04L 61/2575* | (2022.01) |
| *H04L 45/745* | (2022.01) |
| *H04L 69/22* | (2022.01) |
| *H04L 101/668* | (2022.01) |

(52) U.S. Cl.
CPC ........ *H04L 61/2575* (2013.01); *H04L 45/745* (2013.01); *H04L 69/22* (2013.01); *H04L 2101/668* (2022.05)

(58) Field of Classification Search
CPC ... H04L 61/2575; H04L 45/745; H04L 69/22; H04L 2101/668
See application file for complete search history.

(56) References Cited

U.S. PATENT DOCUMENTS

| | | | |
|---|---|---|---|
| 7,334,049 B1 | 2/2008 | Somasundaram et al. | |
| 8,108,554 B1 | 1/2012 | Masters | |
| 9,800,517 B1* | 10/2017 | Anderson | ........... H04L 63/0428 |
| 10,735,476 B1* | 8/2020 | VanderKnyff | .......... H04L 69/14 |
| 11,233,858 B2 | 1/2022 | Asveren et al. | |
| 2013/0088733 A1* | 4/2013 | Yach | ...................... G06F 3/1219 |
| | | | 358/1.13 |
| 2016/0072764 A1 | 3/2016 | Arshinov | |
| 2016/0119165 A1* | 4/2016 | Keronen | ............. H04L 12/4633 |
| | | | 370/254 |
| 2018/0159777 A1* | 6/2018 | Ramalho | .................. H04L 1/189 |
| 2019/0342365 A1* | 11/2019 | Vysotsky | ............ H04L 65/4015 |
| 2022/0353335 A1* | 11/2022 | Fei | ........................ H04L 67/141 |

(Continued)

OTHER PUBLICATIONS

Extended European Search Report for Application No. EP23173435. 1, dated Dec. 4, 2023, 8 pages.

(Continued)

*Primary Examiner* — Blake J Rubin
(74) *Attorney, Agent, or Firm* — Harrity & Harrity, LLP (57) ABSTRACT

A virtual network device may identify a cloud provider associated with the virtual network device, and may provide a request for public network addresses and private network addresses associated with the cloud provider. The virtual network device may receive the public network addresses and the private network addresses from the cloud provider based on the request, and may generate a translation table that maps the public network addresses and the private network addresses. The virtual network device may utilize the translation table to establish a secure communication between an endpoint device and a server device, where the secure communication is associated with at least one packet that requires an inner payload network address change.

20 Claims, 8 Drawing Sheets

(56) References Cited

U.S. PATENT DOCUMENTS

2023/0216947 A1\*  7/2023  Bernardi ................. H04L 63/10
                                              713/150

OTHER PUBLICATIONS

Hansen H.V., et al., "DevCom: Device Communities for User-friendly and Trustworthy Communication, Sharing, and Collaboration," Computer Communications, Jul. 2016, vol. 85, pp. 14-27, XP093096535, Retrieved from the Internet: [URL:https://www.sciencedirect.com/science/article/pii/S0140366416300202].

\* cited by examiner

PROVIDING CLOUD-AWARE SECURITY FOR AN APPLICATION LEVEL NETWORK DEVICE

BACKGROUND

In a cloud computing environment, each virtual network device may include a private network address (e.g., a private Internet protocol (IP) address) and a public network address (e.g., a public IP address) facing a public network (e.g., the Internet).

SUMMARY

Some implementations described herein relate to a method. The method may include identifying a cloud provider associated with a virtual network device, and providing a request for public network addresses and private network addresses associated with the cloud provider. The method may include receiving the public network addresses and the private network addresses from the cloud provider based on the request, and generating a translation table that maps the public network addresses and the private network addresses. The method may include utilizing the translation table to establish a secure communication between an endpoint device and a server device, wherein the secure communication is associated with at least one packet that requires an inner payload network address change.

Some implementations described herein relate to a virtual network device. The virtual network device may include one or more memories and one or more processors. The one or more processors may be configured to identify a cloud provider associated with the virtual network device, and provide a request for public network addresses and private network addresses associated with the cloud provider. The one or more processors may be configured to receive the public network addresses and the private network addresses from the cloud provider based on the request, and generate a translation table that maps the public network addresses and the private network addresses. The one or more processors may be configured to receive, from an endpoint device, a packet destined for a server device, and utilize the translation table to translate a source network address of a header of the packet to a private network address. The one or more processors may be configured to utilize the translation table to translate a control message of the packet to a public network address, and enable a secure communication between the endpoint device and the server device based on the translated source network address of the header and the translated control message, wherein the secure communication is associated with at least one packet that requires an inner payload network address change.

Some implementations described herein relate to a non-transitory computer-readable medium that stores a set of instructions. The set of instructions, when executed by one or more processors of a virtual network device, may cause the virtual network device to identify a cloud provider associated with the virtual network device, and provide a request for public network addresses and private network addresses associated with the cloud provider. The set of instructions, when executed by one or more processors of the virtual network device, may cause the virtual network device to receive the public network addresses and the private network addresses from the cloud provider based on the request, and generate a translation table that maps the public network addresses and the private network addresses. The set of instructions, when executed by one or more processors of the virtual network device, may cause the virtual network device to receive, from an endpoint device, a packet destined for a server device, and utilize the translation table to translate a source network address of a header of the packet to a private network address. The set of instructions, when executed by one or more processors of the virtual network device, may cause the virtual network device to utilize the translation table to translate a control message of the packet to a public network address, and enable a secure communication between the endpoint device and the server device based on the translated source network address of the header and the translated control message, wherein the secure communication is associated with at least one packet that requires an inner payload network address change. The set of instructions, when executed by one or more processors of the virtual network device, may cause the virtual network device to provide the packet, with the translated source network address of the header and the translated control message, to the server device.

DETAILED DESCRIPTION

The following detailed description of example implementations refers to the accompanying drawings. The same reference numbers in different drawings may identify the same or similar elements.

A virtual network device may perform network address translation based on a private network address allocated by cloud service provider, and a network device (e.g., an application layer gateway) may translate the private network address into a public network address. For example, if an endpoint device is attempting to access a public server device (e.g., a file transfer protocol (FTP) server device) via a virtual network device, the virtual network device will be unable to translate using the public network address of the virtual network device because packets received from the public server device will be translated to the private network address of the virtual network device by the network device. Because of this, reverse session lookups will fail in the virtual network device and the virtual network will be unable to provide secure communications. Furthermore, the virtual network device may translate packets (e.g., received from the endpoint device and with inner payload private network addresses) to the private network address of the virtual network device, and may provide the translated packets to the public server device. However, the public server device will not understand the private network address of the virtual network device since the public server device only understands the public network address of the network device. Thus, the public server device will be unable to connect with the endpoint device and receive the packets from the endpoint device.

Thus, current techniques for providing secure cloud-based communications (e.g., for packets that require application level network devices and translation of network addresses in the inner payloads) consume computing resources (e.g., processing resources, memory resources, communication resources, and/or the like), networking resources, and/or the like, associated with attempting and failing to provide packets from an endpoint device to a public server device, attempting and failing to provide packets from the public server device to the endpoint device, attempting and failing to establish secure communications between the endpoint device and the public server device, and/or the like.

Some implementations described herein relate to providing cloud-aware security for an application level network device (e.g., a virtual network device). For example, the virtual network device may identify a cloud provider associated with the virtual network device, and may provide a request for public network addresses and private network addresses associated with the cloud provider. The virtual network device may receive the public network addresses and the private network addresses from the cloud provider based on the request, and may generate a translation table that maps the public network addresses and the private network addresses. The virtual network device may receive, from an endpoint device, a packet destined for a server device, and may utilize the translation table to translate a source network address of a header of the packet to a private network address. The virtual network device may utilize the translation table to translate a control message of the packet to a public network address, and may enable a secure communication between the endpoint device and the server device based on the translated source network address of the header and the translated control message. The virtual network device may provide the packet, with the translated source network address of the header and the translated control message, to the server device.

In this way, cloud-aware security is provided for an application level network device (e.g., a virtual network device). For example, the virtual network device may determine that the virtual network device is operating within a cloud computing environment, and may receive public network addresses and private network addresses associated with the cloud computing environment. The virtual network device may build a translation table that maps the public network addresses and the private network addresses. The virtual network device may utilize the translation table for network address translations and to provide secure communications between an endpoint device and a public server device. Thus, the virtual network device conserves computing resources, networking resources, and/or the like that would otherwise have been consumed by attempting and failing to provide packets from an endpoint device to a public server device, attempting and failing to provide packets from the public server device to the endpoint device, attempting and failing to establish secure communications between the endpoint device and the public server device, and/or the like.

FIGS. 1A-1D are diagrams of an example 100 associated with providing cloud-aware security for an application level network device. As shown in FIGS. 1A-1D, example 100 includes an endpoint device, a server device, a network device, and a cloud computing environment with a virtual network device. Further details of the endpoint device, the server device, the network device, the cloud computing environment, and the virtual network device are provided elsewhere herein.

Figure 1A:
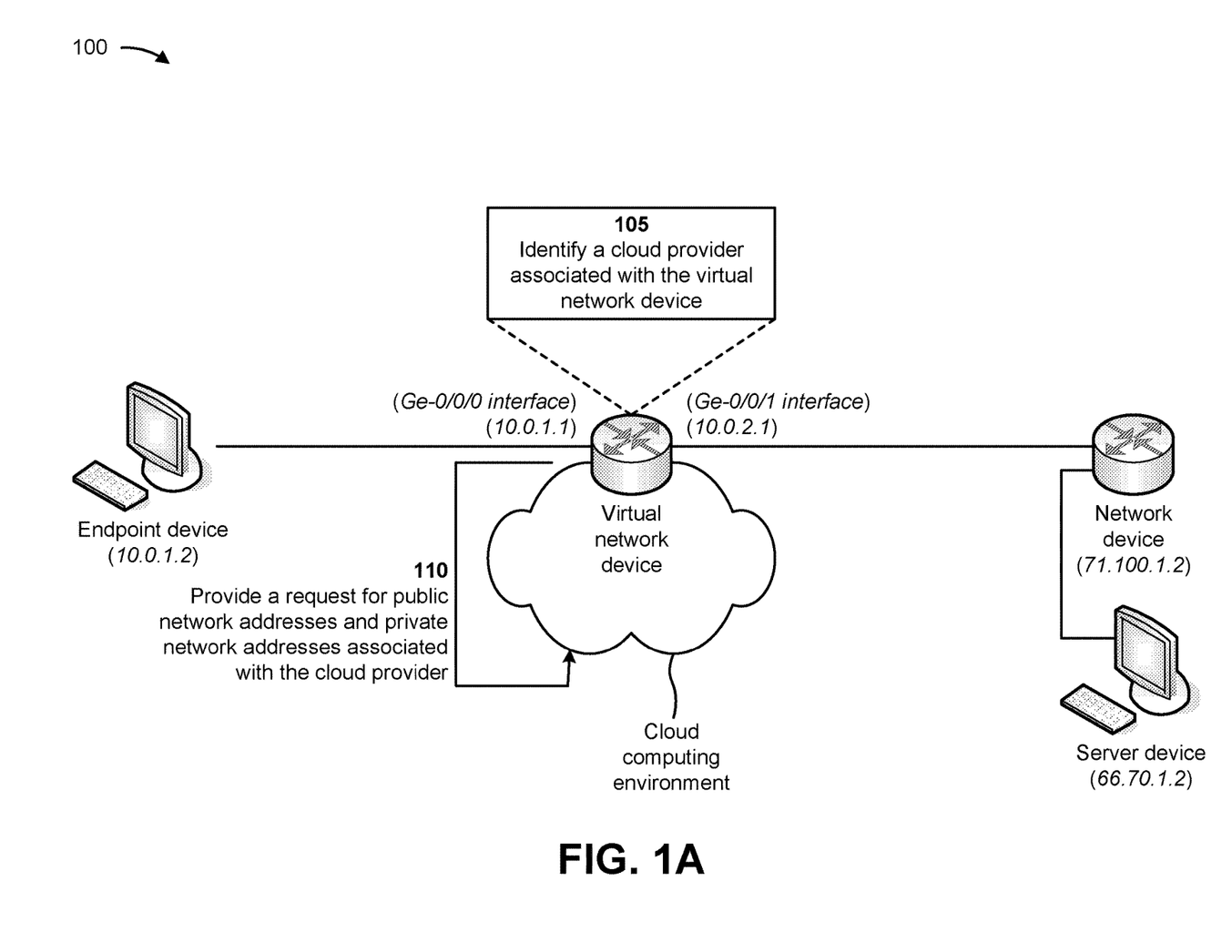
FIGS. 1A-1D are diagrams of an example associated with providing cloud-aware security for an application level network device.

As shown in FIG. 1A, the endpoint device may be associated with a private network address (e.g., a private Internet protocol (IP) address, such as "10.0.1.2"), the network device may be associated with a public network address (e.g., a public IP address, such as "71.100.1.2"), and the server device may be associated with a public network address (e.g., a public IP address, such as "66.70.1.2"). The virtual network device of the cloud computing environment may include a first interface (e.g., a Ge-0/0/0 interface) facing the endpoint device and including a private network address (e.g., a private IP address, such as "10.0.1.1"). The virtual network device may also include a second interface (e.g., a Ge-0/0/1 interface) facing the network device and including a private network address (e.g., a private IP address, such as "10.0.2.1").

As further shown in FIG. 1A, and by reference number 105, the virtual network device may identify a cloud provider associated with the virtual network device. For example, the virtual network device may be associated with a different cloud provider at different times. In some implementations, the virtual network device may include a cloud adaptation layer that identifies a cloud provider associated with the virtual network device and details associated with the cloud provider. For example, the virtual network device may be associated with (e.g., instantiated by) a cloud computing environment provided by Amazon Web Services (AWS), Google Cloud Platform (GCP), Microsoft Azure, and/or the like.

As further shown in FIG. 1A, and by reference number 110, the virtual network device may provide a request for public network addresses and private network addresses associated with the cloud provider. For example, the virtual network device may generate a request that is tailored to requesting the public network addresses and private network addresses from the identified cloud provider. In some implementations, the virtual network device may provide the request for the public network addresses and the private network addresses to a cloud service associated with the cloud provider. For example, if the cloud provider is the AWS, the virtual network device may utilize a "DescribeInstances" application programming interface (API) to request the public network addresses and the private network addresses associated with the AWS. In another example, if the cloud provider is GCP, the virtual network device may utilize an "instances.get" method to request the public network addresses and the private network addresses associated with the GCP.

In some implementations, when providing the request for the public network addresses and the private network addresses associated with the cloud provider, the virtual network device may generate the request based on the cloud provider associated with the virtual network device, and may provide the request for the public network addresses and the private network addresses to a cloud service associated with the cloud provider. In some implementations, when generating the request based on the cloud provider, the virtual network device may generate a first type of the request (e.g., the "DescribeInstances" API) based on the cloud provider being a first cloud provider (e.g., the AWS) or may generate a second type of the request (e.g., the "instances.get" method) based on the cloud provider being a second cloud provider (e.g., the GCP).

In some implementations, when providing the request for the public network addresses and the private network addresses associated with the cloud provider, the virtual network device may utilize a session traversal utilities for network address translation (STUN) protocol to generate a STUN request as the request, and may provide the STUN request for the public network addresses and the private network addresses to a STUN server device. The STUN server device may provide security for the public network addresses and the private network addresses associated with the cloud provider. The virtual network device may not utilize the STUN protocol for every new session since interfaces of the virtual network device ports are not translated.

Figure 1B:
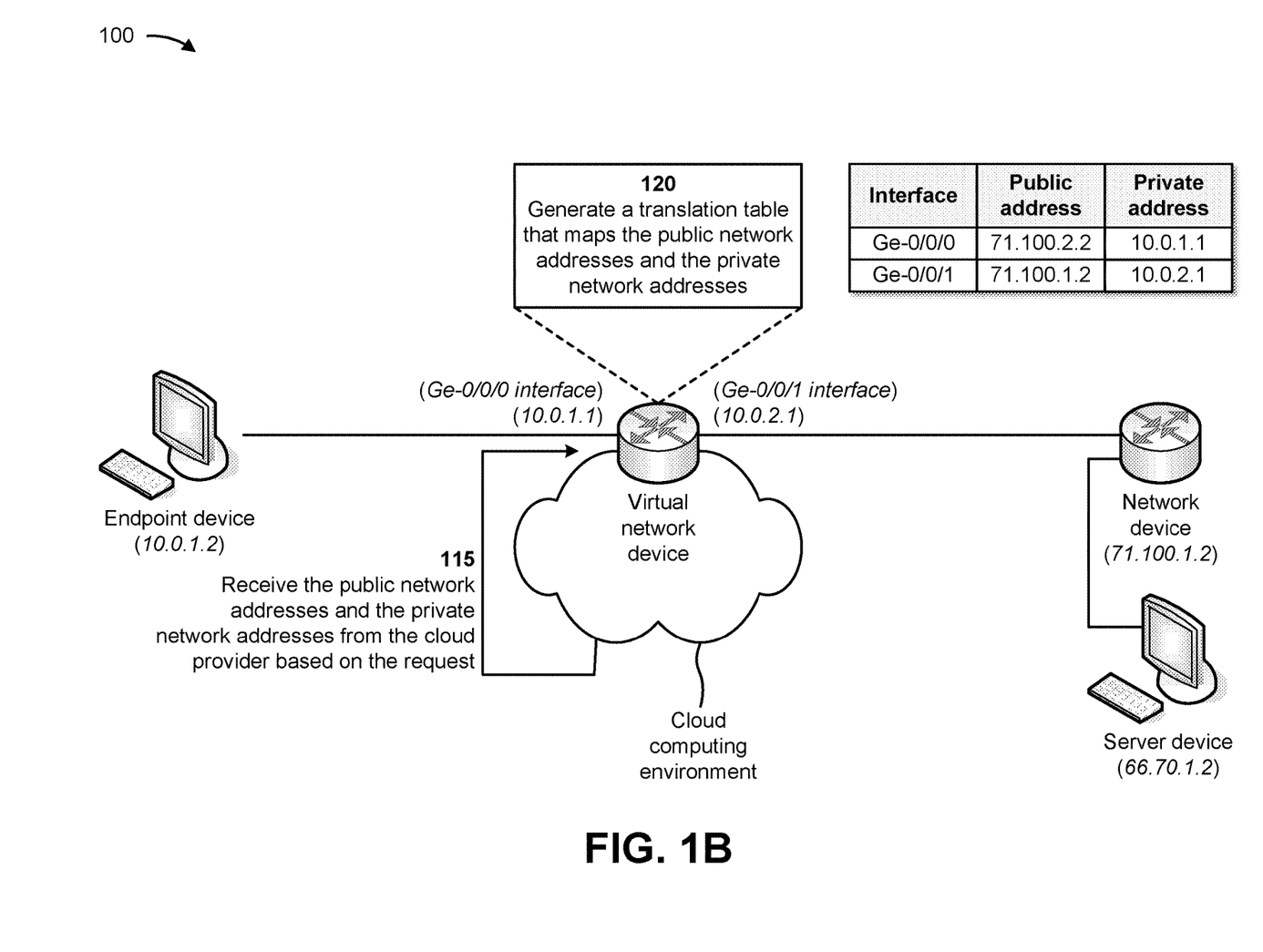

As shown in FIG. 1B, and by reference number 115, the virtual network device may receive the public network addresses and the private network addresses from the cloud provider based on the request. For example, the cloud service associated with the cloud provider may receive the request for the public network addresses and the private network addresses associated with the cloud provider, and may provide the public network addresses and the private network addresses to the virtual network device based on the request. The virtual network device may receive the public network addresses and the private network addresses from the cloud service associated with the cloud provider. In some implementations, the STUN server device may receive the request for the public network addresses and the private network addresses associated with the cloud provider, and may provide the public network addresses and the private network addresses to the virtual network device based on the request. The virtual network device may receive the public network addresses and the private network addresses from the STUN server device.

As further shown in FIG. 1B, and by reference number 120, the virtual network device may generate a translation table that maps the public network addresses and the private network addresses. For example, the virtual network device may generate a translation table that includes a first field identifying interfaces of the virtual network device, a second field identifying the public network addresses, and a third field identifying the private network addresses. In one example, the first field may identify the first interface (e.g., the Ge-0/0/0 interface) of the virtual network device that is facing the endpoint device and the second interface (e.g., the Ge-0/0/1 interface) of the virtual network device that is facing the network device. The second field may identify a first public network address (e.g., "71.100.2.2") and a second public network address (e.g., "71.100.1.2"). The third field may identify a first private network address (e.g., "10.0.1.1") and a second private network address (e.g., "10.0.2.1"). The first public network address may be mapped to the first interface of the virtual network device and to the first private network address. The second public network address may be mapped to the second interface of the virtual network device and to the second private network address. In some implementations, the translation table may include more entries than depicted in FIG. 1B.

Figure 1C:
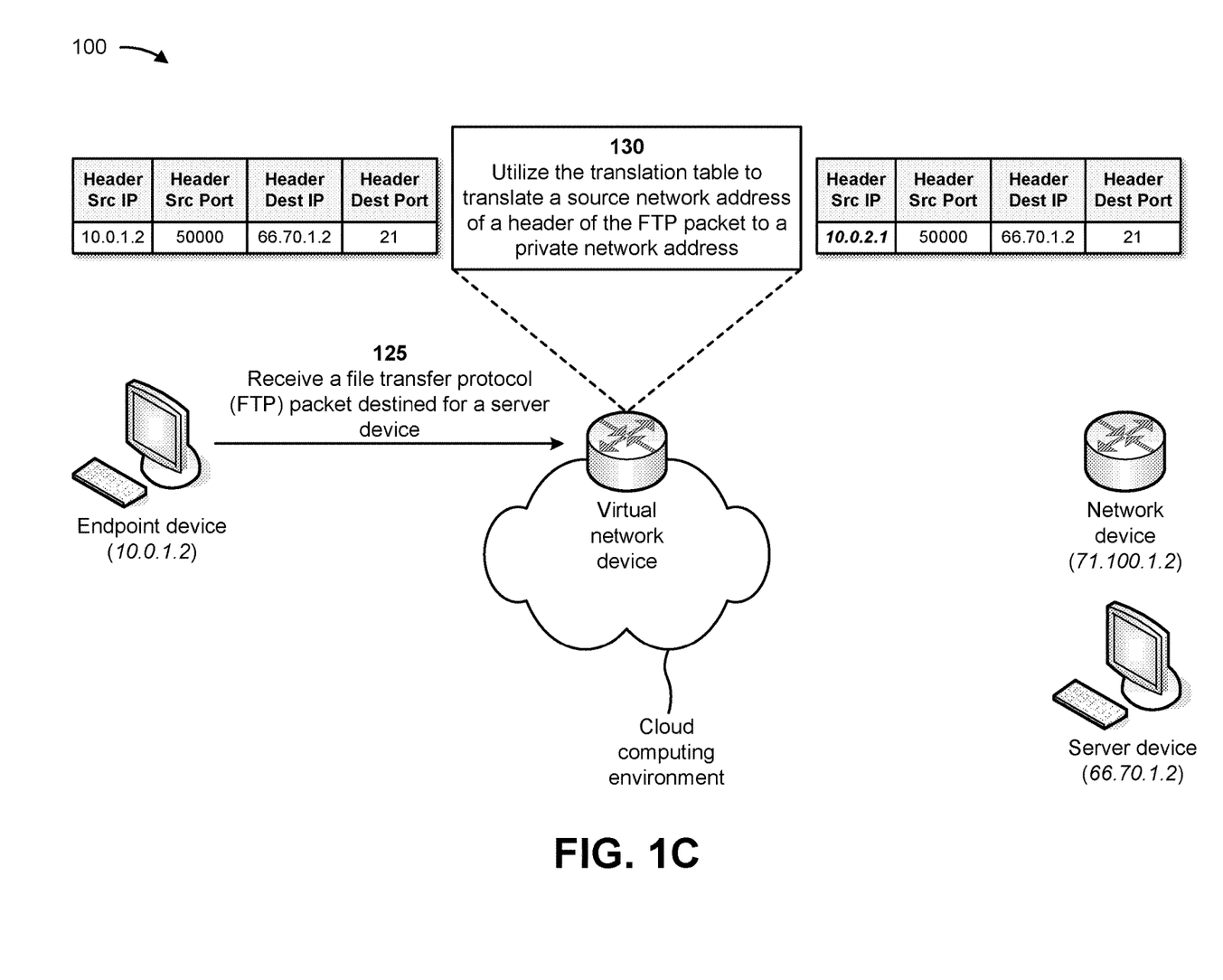

As shown in FIG. 1C, and by reference number 125, the virtual network device may receive a file transfer protocol (FTP) packet destined for the server device. For example, the endpoint device may generate a packet (e.g., an FTP packet) destined for the server device, and may provide the FTP packet to the virtual network device. The virtual network device may receive, from the endpoint device, the FTP packet destined for the server device. In some implementations, a header of the FTP packet may include information identifying a source network address (e.g., the private network address of the endpoint device, such as "10.0.1.2"), a source port (e.g., "50000") of the endpoint device, a destination network address (e.g., the public network address of the server device, such as "66.70.1.2"), and a destination port (e.g., "21") of the server device.

As further shown in FIG. 1C, and by reference number 130, the virtual network device may utilize the translation table to translate a source network address of a header of the FTP packet to a private network address. For example, the virtual network device may utilize the translation table to translate the source network address (e.g., the private network address of the endpoint device, such as "10.0.1.2") of the header of the FTP packet to the private network address (e.g., "10.0.2.1") of the second interface (e.g., a Ge-0/0/1 interface) of the virtual network device. In some implementations, the virtual network device may determine that the translation table is to be utilized prior to utilizing the translation table to translate the source network address of the header of the FTP packet to the private network address. In some implementations, the virtual network device may verify the translation table prior to utilizing the translation table to translate the source network address of the header of the FTP packet to the private network address.

Figure 1D:
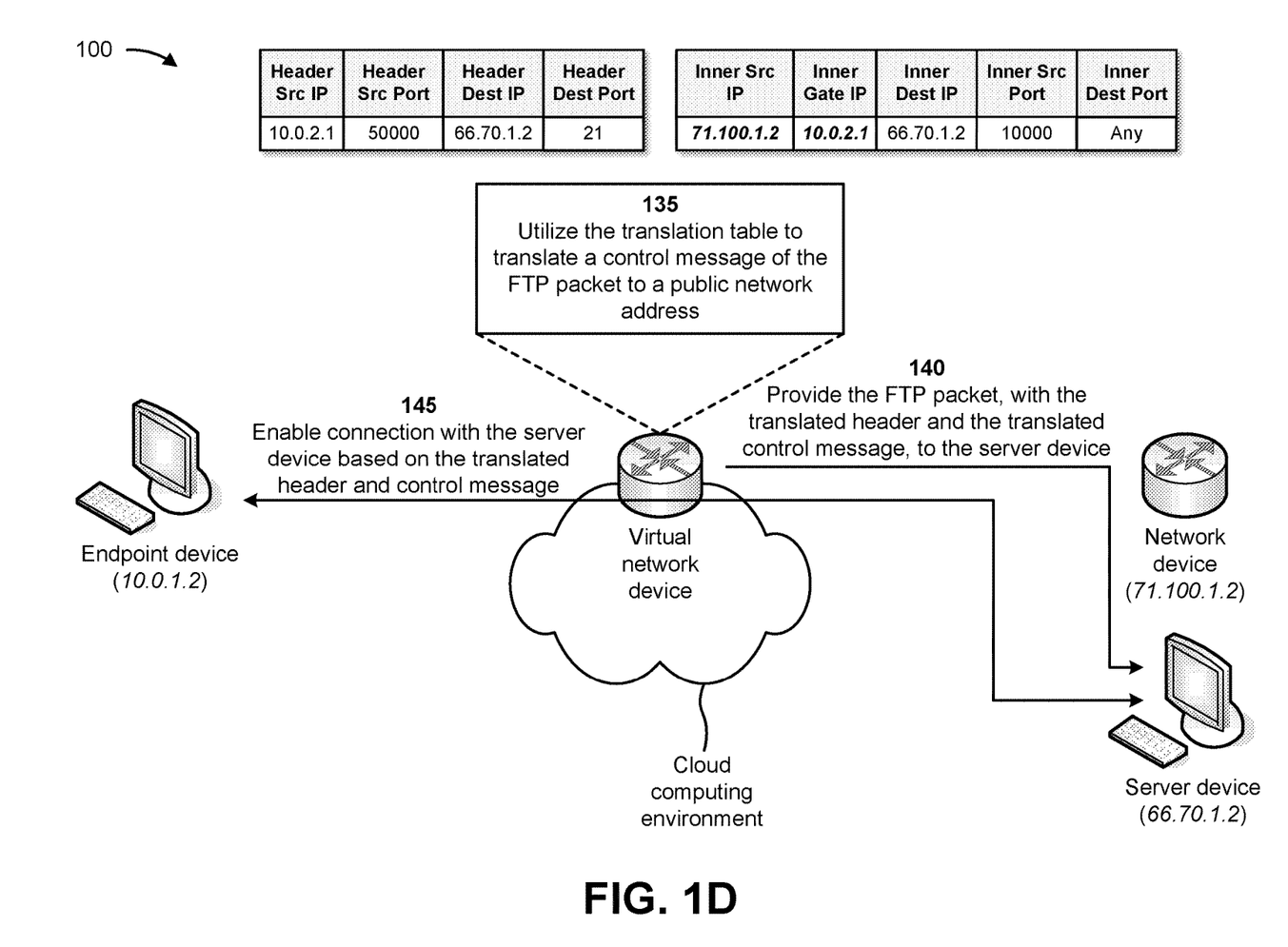

As shown in FIG. 1D, and by reference number 135, the virtual network device may utilize the translation table to translate a control message of the FTP packet to a public network address. For example, a control message of the FTP packet may correspond to an inner payload of the FTP packet, and the virtual network device may utilize the translation table to translate the control message of the FTP packet to the public network address. In some implementations, the virtual network device may utilize the translation table to translate a source network address (e.g., the private network address of "10.0.2.1") of the control message of the FTP packet to the public network address of the network device (e.g., "71.100.2.2") and a source port (e.g., "10000"). In this way, the server device may be able to establish a secure communication with the endpoint device (e.g., via the virtual network device). The virtual network device may also create a gate to enable the secure communication with a private network address (e.g., "10.0.2.1").

As further shown in FIG. 1D, and by reference number 140, the virtual network device may provide the FTP packet, with the translated source network address of the header and the translated control message, to the server device. For example, the virtual network device may provide the FTP packet, with the translated source network address of the header and the translated control message, to the network device. The network device may provide the FTP packet, with the translated source network address of the header and the translated control message, to the server device.

As further shown in FIG. 1D, and by reference number 145, the virtual network device may enable a connection between the endpoint device and the server device based on the translated source network address of the header and the translated control message. For example, the virtual network device may enable a secure connection or communication between the endpoint device and the server device based on the translated source network address of the header and the translated control message. In some implementations, the server device may attempt to connect to the public network address of the network device (e.g., "71.100.2.2") over the source port (e.g., "10000"). The virtual network device may translate the public network address of the network device (e.g., "71.100.2.2") to the gate private network address (e.g., "10.0.1.2"). Since virtual network device already created the gate, the connection between the server device and the endpoint device may be permitted.

In this way, cloud-aware security is provided for an application level network device (e.g., a virtual network device). For example, the virtual network device may determine that the virtual network device is operating within a cloud computing environment, and may receive public network addresses and private network addresses associated with the cloud computing environment. The virtual network device may build a translation table that maps the public network addresses and the private network addresses. The virtual network device may utilize the translation table for network address translations and to provide secure communications between an endpoint device and a public server device. Thus, the virtual network device conserves computing resources, networking resources, and/or the like that would otherwise have been consumed by attempting and failing to provide packets from an endpoint device to a public server device, attempting and failing to provide packets from the public server device to the endpoint device, attempting and failing to establish secure communications between the endpoint device and the public server device, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
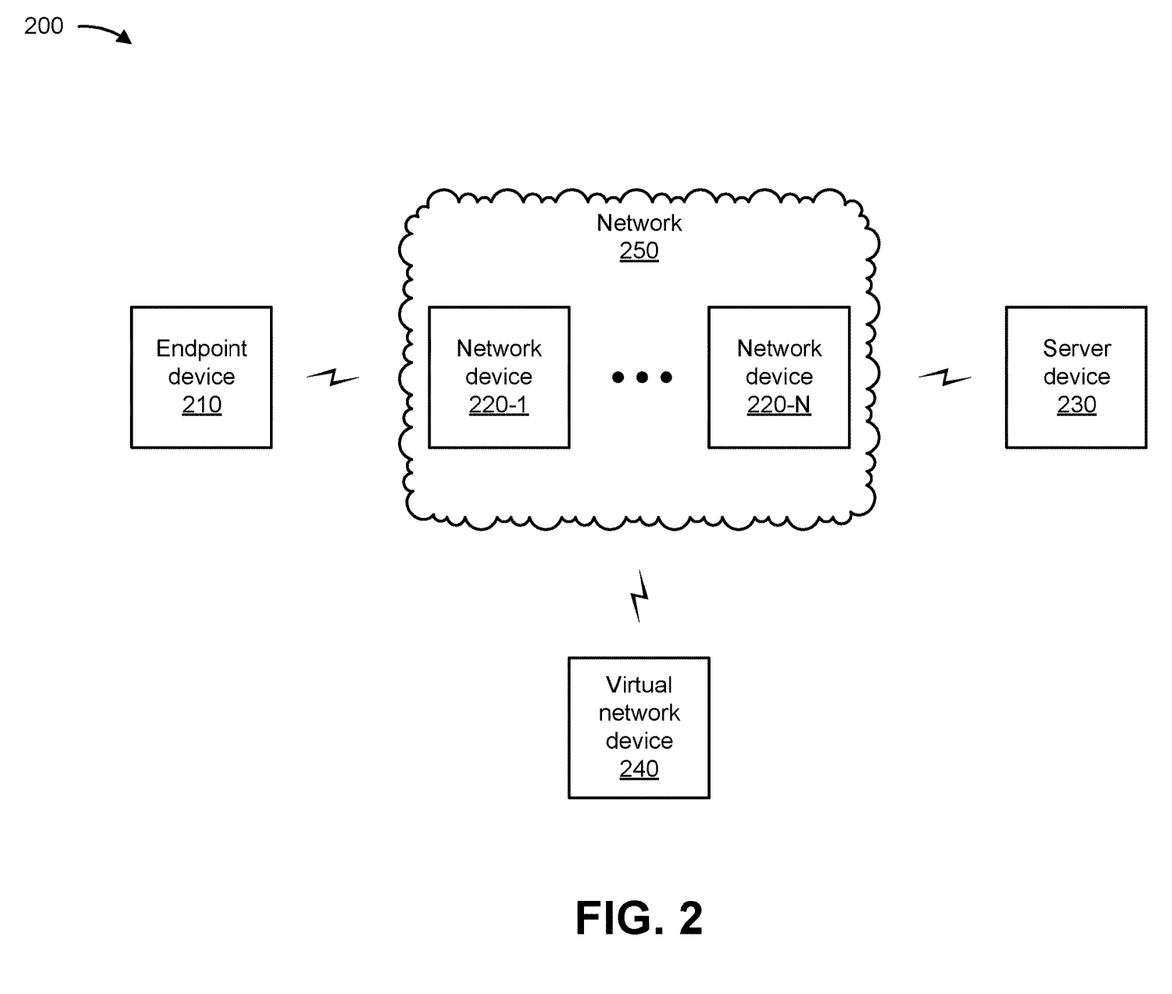
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), a server device 230, a virtual network device 240, and a network 250. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a set-top box, a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device (e.g., a router, a residential gateway, and/or the like), or a similar type of device. In some implementations, the endpoint device 210 may receive network traffic from and/or may provide network traffic to other endpoint devices 210, via the network 250 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 250.

The server device 230 may include one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The virtual network device 240 includes one or more devices capable of receiving, processing, storing, routing, and/or providing traffic (e.g., a packet or other information or metadata) in a manner described herein. For example, the virtual network device 240 may include a virtual router, such as a virtual LSR, a virtual LER, a virtual ingress router, a virtual egress router, a virtual provider router (e.g., a virtual provider edge router or a virtual provider core router), a virtual route reflector, a virtual area border router, or another type of virtual router. Additionally, or alternatively, the virtual network device 240 may include a virtual gateway, a virtual switch, a virtual firewall, a virtual hub, a virtual bridge, a virtual reverse proxy, a virtual server (e.g., a virtual proxy server, a cloud server, or a data center server), a virtual load balancer, and/or a similar virtual device. In some implementations, the virtual network device 240 may be a virtual device implemented by one or more computer devices of a cloud computing environment or a data center.

The network 250 includes one or more wired and/or wireless networks. For example, the network 250 may include a packet switched network, a cellular network (e.g., a fifth generation (5G) network, a fourth generation (4G) network, such as a long-term evolution (LTE) network, and/or a third generation (3G) network), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
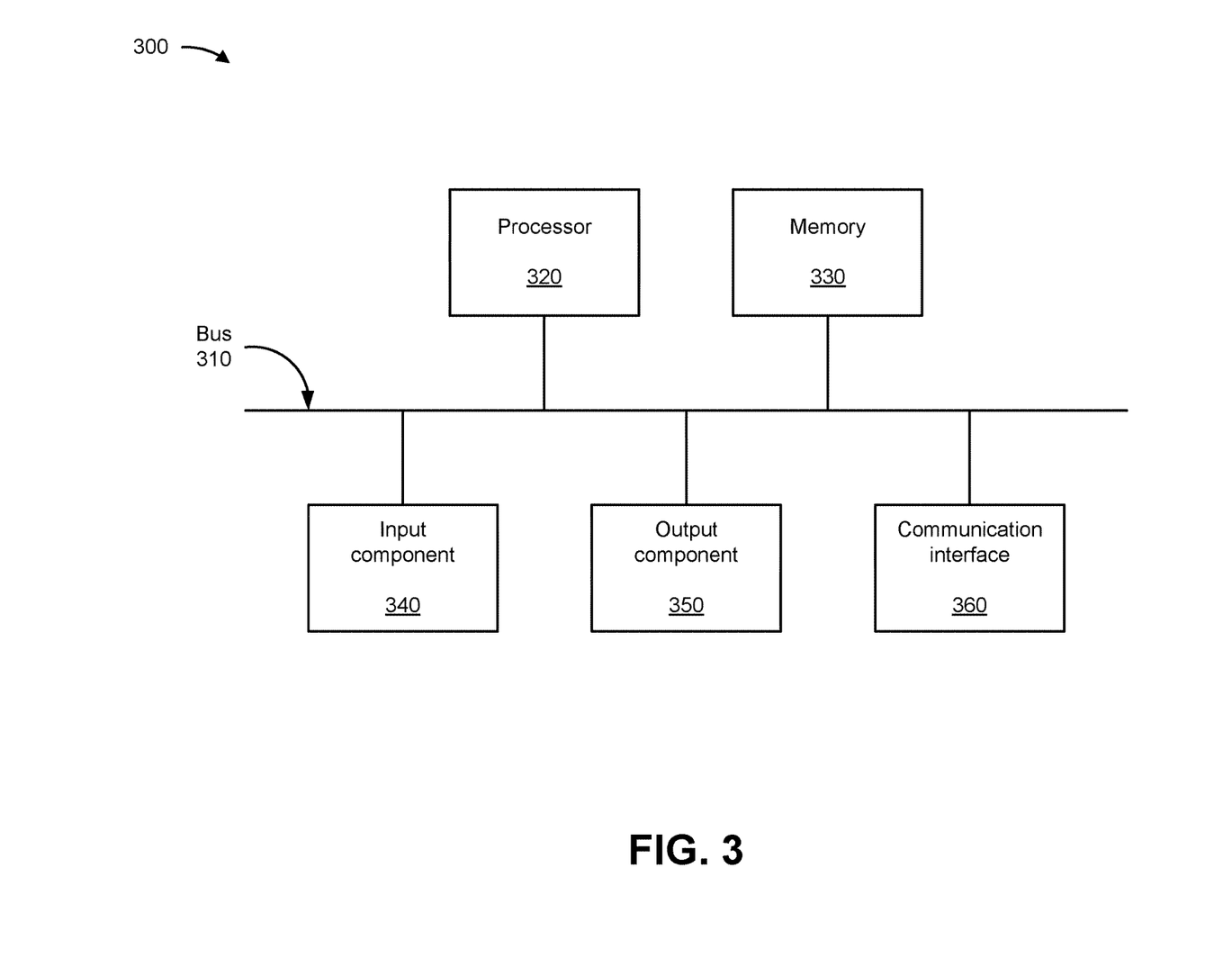
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, the server device 230, and/or the virtual network device 240. In some implementations, the endpoint device 210, the network device 220, the server device 230, and/or the virtual network device 240 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
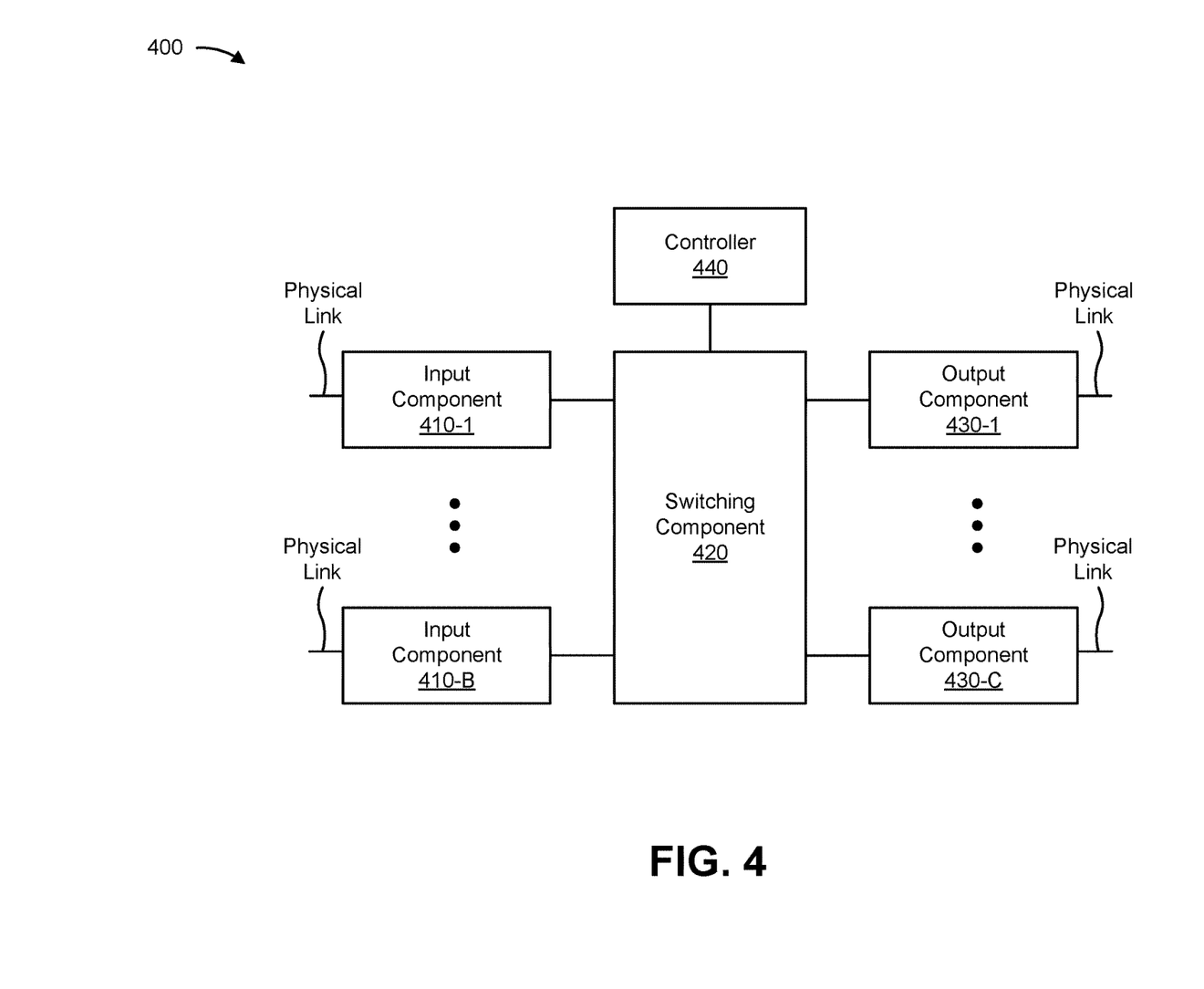

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
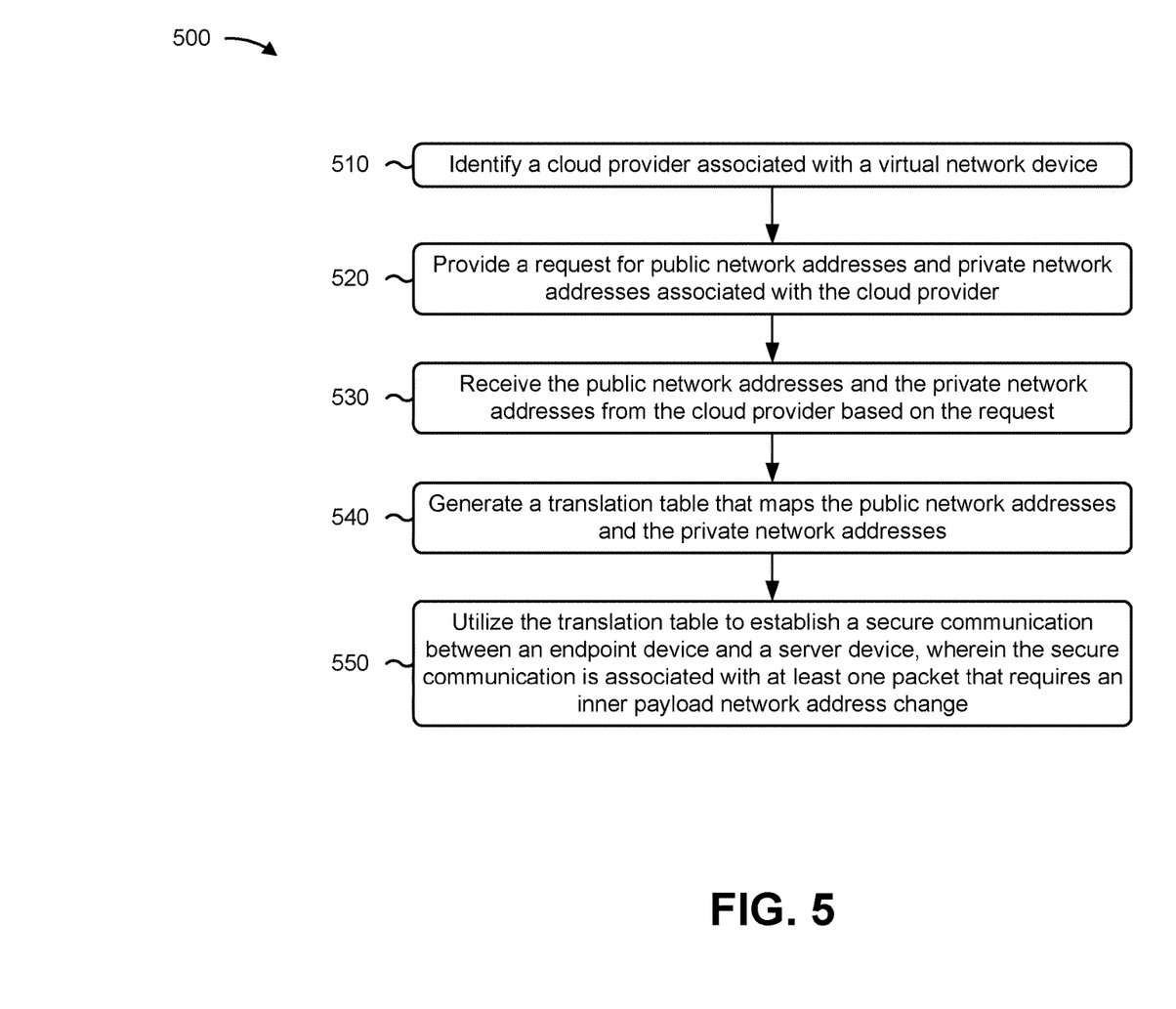
FIG. 5 is a flowchart of an example process for providing cloud-aware security for an application level network device.

FIG. 5 is a flowchart of an example process 500 for providing cloud-aware security for an application level network device. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210) and/or a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include identifying a cloud provider associated with the virtual network device (block 510). For example, the virtual network device may identify a cloud provider associated with the virtual network device, as described above. In some implementations, the virtual network device is included in a cloud computing environment generated by the cloud provider.

As further shown in FIG. 5, process 500 may include providing a request for public network addresses and private network addresses associated with the cloud provider (block 520). For example, the virtual network device may provide a request for public network addresses and private network addresses associated with the cloud provider, as described above. In some implementations, providing the request for the public network addresses and the private network addresses associated with the cloud provider includes generating the request based on the cloud provider associated with the virtual network device, and providing the request for the public network addresses and the private network addresses to a service associated with the cloud provider. In some implementations, generating the request based on the cloud provider associated with the virtual network device comprises one of generating a first type of the request based on the cloud provider being a first cloud provider, or generating a second type of the request based on the cloud provider being a second cloud provider different than the first cloud provider.

In some implementations, providing the request for the public network addresses and the private network addresses associated with the cloud provider includes utilizing a session traversal utilities for network address translation (STUN) protocol to generate a STUN request as the request, and providing the STUN request for the public network addresses and the private network addresses to a STUN server device.

As further shown in FIG. 5, process 500 may include receiving the public network addresses and the private network addresses from the cloud provider based on the request (block 530). For example, the virtual network device may receive the public network addresses and the private network addresses from the cloud provider based on the request, as described above.

As further shown in FIG. 5, process 500 may include generating a translation table that maps the public network addresses and the private network addresses (block 540). For example, the virtual network device may generate a translation table that maps the public network addresses and the private network addresses, as described above. In some implementations, the translation table includes a first field identifying interfaces of the virtual network device, a second field identifying the public network addresses, and a third field identifying the private network addresses, wherein the first field is mapped to the second field and the third field, and the second field is mapped to the third field.

As further shown in FIG. 5, process 500 may include utilizing the translation table to establish a secure communication between an endpoint device and a server device, wherein the secure communication is associated with at least one packet that requires an inner payload network address change (block 550). For example, the virtual network device may utilize the translation table to establish a secure communication between an endpoint device and a server device, as described above. In some implementations, the secure communication is associated with at least one packet that requires an inner payload network address change. In some implementations, utilizing the translation table includes receiving, from the endpoint device, a packet destined for the server device, utilizing the translation table to translate a source network address of a header of the packet to a private network address, utilizing the translation table to translate a control message of the packet to a public network address, and enabling the secure communication between the endpoint device and the server device based on the translated source network address of the header and the translated control message. In some implementations, process 500 includes providing the packet, with the translated source network address of the header and the translated control message, to the server device. In some implementations, the packet is a file transfer protocol (FTP) packet. In some implementations, the control message is an inner payload of the packet. In some implementations, the virtual network device includes a first interface communicating with the endpoint device and a second interface communicating with the server device.

In some implementations, process 500 includes determining that the translation table is to be utilized prior to utilizing the translation table to establish the secure communication between the endpoint device and the server device. In some implementations, process 500 includes verifying the translation table prior to utilizing the translation table to establish the secure communication between the endpoint device and the server device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    identifying, by a virtual network device, a cloud provider associated with the virtual network device,
        wherein the virtual network device is an application level network device;
    providing, by the virtual network device, a request for public network addresses and private network addresses associated with the cloud provider;
    receiving, by the virtual network device, the public network addresses and the private network addresses from the cloud provider based on the request;
    generating, by the virtual network device, a translation table that maps the public network addresses and the private network addresses; and
    utilizing, by the virtual network device, the translation table to establish a secure communication between an endpoint device and a server device,
        wherein the secure communication is associated with at least one packet that requires an inner payload network address change.

2. The method of claim 1, wherein utilizing the translation table comprises:
    receiving, from the endpoint device, a packet destined for the server device;
    utilizing the translation table to translate a source network address of a header of the packet to a private network address;
    utilizing the translation table to translate a control message of the packet to a public network address; and enabling the secure communication between the endpoint device and the server device based on the translated source network address of the header and the translated control message.

3. The method of claim 2, further comprising:
providing the packet, with the translated source network address of the header and the translated control message, to the server device.

4. The method of claim 2, wherein the packet is a file transfer protocol (FTP) packet.

5. The method of claim 2, wherein the control message is an inner payload of the packet.

6. The method of claim 1, wherein providing the request for the public network addresses and the private network addresses associated with the cloud provider comprises:
generating the request based on the cloud provider associated with the virtual network device; and
providing the request for the public network addresses and the private network addresses to a service associated with the cloud provider.

7. The method of claim 6, wherein generating the request based on the cloud provider associated with the virtual network device comprises one of:
generating a first type of the request based on the cloud provider being a first cloud provider; or
generating a second type of the request based on the cloud provider being a second cloud provider different than the first cloud provider.

8. A virtual network device, comprising:
one or more memories; and
one or more processors to:
identify a cloud provider associated with the virtual network device,
wherein the virtual network device is an application level network device;
provide a request for public network addresses and private network addresses associated with the cloud provider;
receive the public network addresses and the private network addresses from the cloud provider based on the request;
generate a translation table that maps the public network addresses and the private network addresses;
receive, from an endpoint device, a packet destined for a server device;
utilize the translation table to translate a source network address of a header of the packet to a private network address;
utilize the translation table to translate a control message of the packet to a public network address; and
enable a secure communication between the endpoint device and the server device based on the translated source network address of the header and the translated control message,
wherein the secure communication is associated with at least one packet that requires an inner payload network address change.

9. The virtual network device of claim 8, wherein the translation table includes:
a first field identifying interfaces of the virtual network device,
a second field identifying the public network addresses, and
a third field identifying the private network addresses,
wherein the first field is mapped to the second field and the third field, and the second field is mapped to the third field.

10. The virtual network device of claim 8, wherein the one or more processors are further to:
determine that the translation table is to be utilized prior to utilizing the translation table to establish the secure communication between the endpoint device and the server device.

11. The virtual network device of claim 8, wherein the one or more processors are further to:
verify the translation table prior to utilizing the translation table to establish the secure communication between the endpoint device and the server device.

12. The virtual network device of claim 8, wherein the one or more processors, to provide the request for the public network addresses and the private network addresses associated with the cloud provider, are to:
utilize a session traversal utilities for network address translation (STUN) protocol to generate a STUN request as the request; and
provide the STUN request for the public network addresses and the private network addresses to a STUN server device.

13. The virtual network device of claim 8, wherein the virtual network device is included in a cloud computing environment generated by the cloud provider.

14. The virtual network device of claim 8, wherein the virtual network device includes a first interface communicating with the endpoint device and a second interface communicating with the server device.

15. A non-transitory computer-readable medium storing a set of instructions, the set of instructions comprising:
one or more instructions that, when executed by one or more processors of a virtual network device, cause the virtual network device to:
identify a cloud provider associated with the virtual network device,
wherein the virtual network device is an application level network device;
provide a request for public network addresses and private network addresses associated with the cloud provider;
receive the public network addresses and the private network addresses from the cloud provider based on the request;
generate a translation table that maps the public network addresses and the private network addresses;
receive, from an endpoint device, a packet destined for a server device;
utilize the translation table to translate a source network address of a header of the packet to a private network address;
utilize the translation table to translate a control message of the packet to a public network address;
enable a secure communication between the endpoint device and the server device based on the translated source network address of the header and the translated control message,
wherein the secure communication is associated with at least one packet that requires an inner payload network address change; and
provide the packet, with the translated source network address of the header and the translated control message, to the server device.

16. The non-transitory computer-readable medium of claim 15, wherein the one or more instructions, that cause the virtual network device to provide the request for the public network addresses and the private network addresses associated with the cloud provider, cause the virtual network device to:

generate the request based on the cloud provider associated with the virtual network device; and     provide the request for the public network addresses and the private network addresses to a service associated with the cloud provider.

17. The non-transitory computer-readable medium of claim 16, wherein the one or more instructions, that cause the virtual network device to generate the request based on the cloud provider associated with the virtual network device, cause the virtual network device to:

generate a first type of the request based on the cloud provider being a first cloud provider; or     generate a second type of the request based on the cloud provider being a second cloud provider different than the first cloud provider.

18. The non-transitory computer-readable medium of claim 15, wherein the translation table includes:

a first field identifying interfaces of the virtual network device,     a second field identifying the public network addresses, and     a third field identifying the private network addresses,     wherein the first field is mapped to the second field and the third field, and the second field is mapped to the third field.

19. The non-transitory computer-readable medium of claim 15, wherein the one or more instructions further cause the virtual network device to:

determine that the translation table is to be utilized prior to utilizing the translation table to establish the secure communication between the endpoint device and the server device.

20. The non-transitory computer-readable medium of claim 15, wherein the one or more instructions further cause the virtual network device to:

verify the translation table prior to utilizing the translation table to establish the secure communication between the endpoint device and the server device.

\* \* \* \* \*